US012779607B2

(12) United States Patent
Giesel et al.

(10) Patent No.: US 12,779,607 B2
(45) Date of Patent: Nov. 3, 2026

(54) MACHINING APPARATUS AND METHOD FOR MACHINING THE OUTER CIRCUMFERENCE OF A ROTOR BY USING SUCH AN APPARATUS

(71) Applicant: Siemens Energy Global GmbH & Co. KG, Munich (DE)

(72) Inventors: Rick Giesel, Essen (DE); Marat Visajtaev, Bottrop (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 460 days.

(21) Appl. No.: 18/568,810

(22) PCT Filed: May 20, 2022

(86) PCT No.: PCT/EP2022/063768
§ 371 (c)(1),
(2) Date: Dec. 9, 2023

(87) PCT Pub. No.: WO2022/268418
PCT Pub. Date: Dec. 29, 2022

(65) Prior Publication Data
US 2024/0269789 A1 Aug. 15, 2024

(30) Foreign Application Priority Data
Jun. 21, 2021 (DE) ..................... 10 2021 206 318.7

(51) Int. Cl.
*B23Q 9/02* (2006.01)
*B23C 3/00* (2006.01)
(Continued)

(52) U.S. Cl.
CPC ................ *B23Q 9/02* (2013.01); *B23C 3/007* (2013.01); *B23P 6/002* (2013.01); *B23Q 9/0007* (2013.01);
(Continued)

(58) Field of Classification Search
CPC ...... B23Q 9/0007; B23Q 9/0021; B23Q 9/02; F01D 25/285; F05D 2230/10; F05D 2230/72; F05D 2230/80; B23P 6/002; B23C 3/002; B23C 3/007; B23C 3/04; B23C 3/122
See application file for complete search history.

(56) References Cited

U.S. PATENT DOCUMENTS 3,840,170 A 10/1974 Arikawa
2007/0077148 A1 * 4/2007 Bird ........................ B23P 6/002 416/223 R
(Continued)

FOREIGN PATENT DOCUMENTS

DE 19614611 A1 10/1997
DE 102004031756 A1 1/2006
(Continued)

OTHER PUBLICATIONS

PCT International Search Report and Written Opinion of International Searching Authority mailed Nov. 7, 2022 corresponding to PCT International Application No. PCT/EP2022/063768 filed May 22, 2022.

*Primary Examiner* — Jermie E Cozart
(74) *Attorney, Agent, or Firm* — Wolter Van Dyke Davis, PLLC

(57) ABSTRACT

A machining apparatus which is designed for machining the outer circumference of a rotor, in particular of a gas-turbine or steam-turbine rotor, includes a plurality of separate carriages, at least one tensioning strap, wherein the carriages can be connected to one another to create an annular arrangement, and also having a tensioning device, in particular in the form of a pressure ratchet, which is designed for tensioning the tensioning strap. The carriages are each provided with preferably floating-mounted wheels, which are oriented in a direction of travel, and wherein at least one carriage has a tool carrier for accommodating a machining tool and driving it by motor. A method for machining the
(Continued)

outer circumference of a rotor by using such a machining apparatus is provided.

21 Claims, 14 Drawing Sheets

(51) Int. Cl.

| | |
|---|---|
| ***B23P 6/00*** | (2006.01) |
| ***B23Q 9/00*** | (2006.01) |
| ***F01D 25/28*** | (2006.01) |
| *B23C 3/04* | (2006.01) |
| *B23C 3/12* | (2006.01) |

(52) U.S. Cl.

CPC ......... *B23Q 9/0021* (2013.01); *F01D 25/285* (2013.01); *B23C 3/002* (2013.01); *B23C 3/04* (2013.01); *B23C 3/122* (2013.01); *F05D 2230/10* (2013.01); *F05D 2230/72* (2013.01); *F05D 2230/80* (2013.01)

(56) References Cited

U.S. PATENT DOCUMENTS

| | | | | |
|---|---|---|---|---|
| 2011/0185570 | A1* | 8/2011 | Bird | F01D 5/005 29/888.021 |
| 2013/0334751 | A1* | 12/2013 | Hogg | B23D 79/10 269/1 |
| 2014/0026731 | A1 | 1/2014 | Pierce | |
| 2015/0306682 | A1 | 10/2015 | Merle | |
| 2017/0043418 | A1* | 2/2017 | Pierce | B24B 27/0616 |
| 2019/0143425 | A1* | 5/2019 | Pierce | B23C 3/122 83/745 |
| 2021/0069812 | A1 | 3/2021 | Bublik | |

FOREIGN PATENT DOCUMENTS

| | | | | |
|---|---|---|---|---|
| DE | 202018106427 | U1 | 11/2018 | |
| EP | 2939775 | A1 | 11/2015 | |
| FR | 2044203 | A5 | 2/1971 | |
| SU | 1181785 | A * | 9/1985 | B23Q 9/0021 |

* cited by examiner

MACHINING APPARATUS AND METHOD FOR MACHINING THE OUTER CIRCUMFERENCE OF A ROTOR BY USING SUCH AN APPARATUS

CROSS REFERENCE TO RELATED APPLICATIONS

This application is the US National Stage of International Application No. PCT/EP2022/063768 filed 20 May 2022, and claims the benefit thereof, which is incorporated by reference herein in its entirety. The International Application claims the benefit of German Application No. DE 10 2021 206 318.7 filed 21 Jun. 2021.

FIELD OF INVENTION

The invention relates to a machining apparatus that is designed for machining the outer circumference of a rotor, in particular of a gas or steam turbine rotor. The invention furthermore relates to a method for machining the outer circumference of a rotor using such an apparatus.

BACKGROUND OF INVENTION

It is sometimes desirable or necessary to overhaul gas turbine rotors of existing gas turbines by machining, for example in order to increase the depth and/or the width of a groove that is already present on the outer circumference of the rotor. To carry out the machining, the rotor must be uninstalled from the turbine and then transported to a machine hall in which a suitable machining apparatus is present. This approach is however very time-intensive and involves long downtimes of the gas turbine, which entails high costs and is therefore not desirable. Alternatively, it is also possible for a transportable machining apparatus to be brought to the installation site of the gas turbine in order to machine the rotor, in the uninstalled state, at the installation site of the gas turbine. Downtimes can thus be shortened. Most known machining apparatuses are however large and bulky, and very high costs are therefore involved in transporting, assembling and disassembling them.

SUMMARY OF INVENTION

Taking this prior art as a starting point, it is an object of the present invention to create a machining apparatus and a method of the type mentioned in the introduction which at least partially solve the aforementioned problems.

To achieve this object, the present invention provides a machining apparatus of the type mentioned in the introduction, which machining apparatus comprises multiple separate carriages, at least one lashing strap by means of which the carriages are connectable to one another to create a ring-shaped arrangement, and a tensioning device, in particular in the form of a push-type ratchet, which is designed for tensioning the lashing strap, wherein the carriages are each equipped with preferably floatingly mounted wheels which are oriented in a direction of travel, and wherein at least one carriage has a tool carrier for receiving a machining tool and for driving said machining tool by motor means. The machining apparatus according to the invention can be tensioned, using the lashing strap, around the rotor that is to be machined, for example at the installation site of a gas turbine. The rotor does not necessarily need to be uninstalled from the gas turbine housing for this purpose. Depending on the nature of the machining, it may also suffice for the upper housing half of the gas turbine housing to be removed and for the lower turbine stator blade carrier to be dislocated in order to thus expose that circumferential region of the rotor which is to be machined. When positioning the machining apparatus on the rotor, the number of carriages can be adapted to the rotor diameter. The individual carriages are advantageously arranged such that uniform spacings are created between them in a circumferential direction. The sizes of rotor diameters that can be machined is highly variable, because the lashing length of the at least one lashing strap can be readily changed during the tensioning operation. The tension force, and thus the force with which the individual carriages are pressed against the surface of the rotor, can also be adjusted in a highly flexible manner. A further advantage of the machining apparatus according to the invention consists in its low intrinsic weight, which is likewise attributable to the lashing strap. The machining apparatus can correspondingly be relatively easily transported, assembled and disassembled. The transport dimensions of the machining apparatus are furthermore very small. Altogether, the present invention provides an inexpensive machining apparatus, which is easy to transport, to assemble and to disassemble and which can be used in a highly flexible manner, for a wide variety of different rotor diameters, at the installation site of a machine whose rotor is to be machined.

At least some carriages are preferably equipped with a lashing strap guide surface that is formed by a lashing strap guide roller, in order to ensure optimum and defined contact for the at least one lashing strap.

At least some carriages advantageously comprise at least one clamping jaw which is movable between a release position and a clamping position and which has a clamping surface, wherein the clamping surface, in the clamping position, presses in the direction of the lashing strap guide surface such that the lashing strap placed between the lashing strap guide surface and the clamping surface is secured by clamping action. By means of such clamping jaws, the individual carriages can be fastened to the lashing strap along the longitudinal extent of said lashing strap. This prevents the spacings between the individual carriages from being able to change during the machining. Furthermore, it is made significantly easier for the machining apparatus according to the invention to be arranged on the rotor.

Preferably, at least some carriages have a frame to which the wheels are rotatably fastened. Such a frame has a low intrinsic weight and can be manufactured easily and at low cost.

In one refinement of the present invention, the machining apparatus has weights which are in particular of plate-like form, wherein the shape and size of the weights are adapted to the shape and size of the frame such that the weights can be placed preferably form-fittingly into the frame. Said weights can in particular be placed into the frames of those carriages which, when the machining apparatus has been assembled on a rotor, are arranged opposite that carriage which has the tool carrier, in order to compensate for imbalances.

The weights are advantageously equipped with at least one through bore for receiving a securing screw which, after the one or more weights have been placed into a carriage, is detachably connectable to the frame of the corresponding carriage. Correspondingly, the weights, after being placed into a frame, can be fastened to the corresponding frame by means of the at least one securing screw.

At least some carriages preferably have handles. Each carriage can be easily gripped by way of such a handle for example for the purposes of manually implementing the feed movement in a circumferential direction by pulling on one of the carriages. The individual carriages can also be transported more easily owing to the handles.

In one refinement of the present invention, the tool carrier has advancing devices, which are in particular actuatable by means of handwheels, for at least radially and axially advancing the machining tool, wherein at least one advancing device is preferably equipped with a display device that indicates the present advancement value.

The machining tool is preferably a side-milling cutter, wherein other machining tools are also conceivable in principle, for example a grinding disk, a drill or the like. The tool carrier may self-evidently also be designed such that it can receive different tools. Likewise, the tool carrier may also be exchangeable in order to thus allow machining using different machining tools. Alternatively, the machining apparatus may also have multiple carriages having different tool carriers which are designed for receiving different machining tools.

A suctioning device is advantageously provided, the intake opening of which is positioned adjacent to the machining tool.

The carriage that receives the tool carrier may be equipped with at least two track blocks which protrude radially outwardly from the carriage and which are adjustable in an axial direction and which are in alignment with one another, which track blocks serve for guiding the corresponding carriage for example along a groove that is already present on the rotor.

A measuring device that indicates the present tension force of the lashing strap is advantageously provided, in order to enable the tension force that is exerted by means of the lashing strap to be easily adjusted.

The machining apparatus preferably has steel cables that are designed to connect adjacent carriages in order to secure same. The steel cables furthermore make it easier for the machining apparatus to be assembled on a rotor.

In one refinement of the present invention, at least eight carriages are provided. With such a number of carriages, rotors in large diameter ranges can be machined.

A carriage advantageously has a feed device, actuation of which causes the carriage to be moved in a forward and/or backward direction of travel. A very precise feed movement in a circumferential direction can be realized by means of such a feed device.

The feed device preferably has friction wheels that are drivable via a belt drive that is actuatable by means of a handwheel, leading to a very simple construction that is inexpensive to manufacture.

In one refinement of the present invention, at least one lifting device is provided which is in particular actuatable by means of a hand lever and actuation of which enables the friction wheels to be moved selectively forward and backward in a radial direction. Correspondingly, the friction wheels can be selectively moved into and out of contact with the rotor.

Furthermore, to achieve the object stated in the introduction, the present invention provides a method for machining the outer circumference of a rotor, in particular of a gas or steam turbine rotor, the method comprising the following steps: providing a machining apparatus according to the invention; arranging the carriages, which have been connected to one another by means of the at least one lashing strap, such that the carriages are positioned on the rotor, as far as possible at uniform intervals in a circumferential direction, in a rotor region that is to be machined; tensioning the lashing strap until a predetermined tension force is attained; and machining the rotor using the machining tool.

Preferably, a feed direction of the machining tool during the machining is realized by manual movement of the carriage in the circumferential direction of the rotor.

Advantageously, the carriage that is situated opposite the carriage comprising the tool holder is equipped with weights, in order to compensate for imbalances.

The method according to the invention is preferably carried out in situ at the installation site of the machine that has the rotor, in particular in a state in which the rotor is positioned in a lower housing half of a housing of a machine that has the rotor, or in which said rotor has been uninstalled and set down on corresponding support blocks.

BRIEF DESCRIPTION OF THE DRAWINGS

Further features and advantages of the present invention will become clear from the following description of an embodiment of the invention with reference to the appended drawing, in which.

DETAILED DESCRIPTION OF INVENTION

Figure 13:
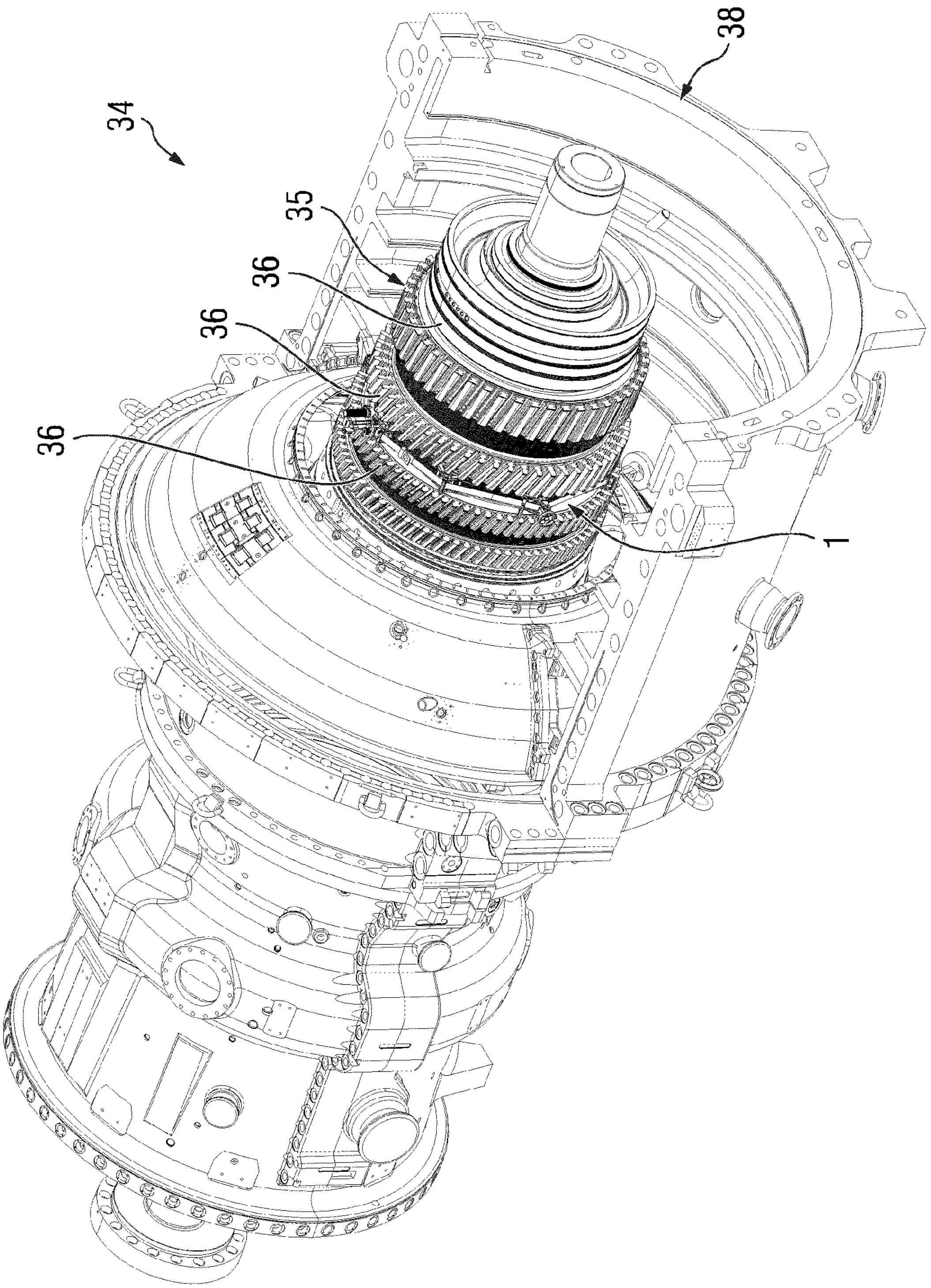
FIG. 13 shows a perspective partial view of a gas turbine, with an upper gas turbine half having been removed, and with the machining apparatus shown in FIG. 1 having been assembled on the rotor of the gas turbine.

The directional terms "axial direction", "radial direction" and "circumferential direction" used below relate to the rotor that is to be machined, as shown in FIG. 13.

Figure 1:
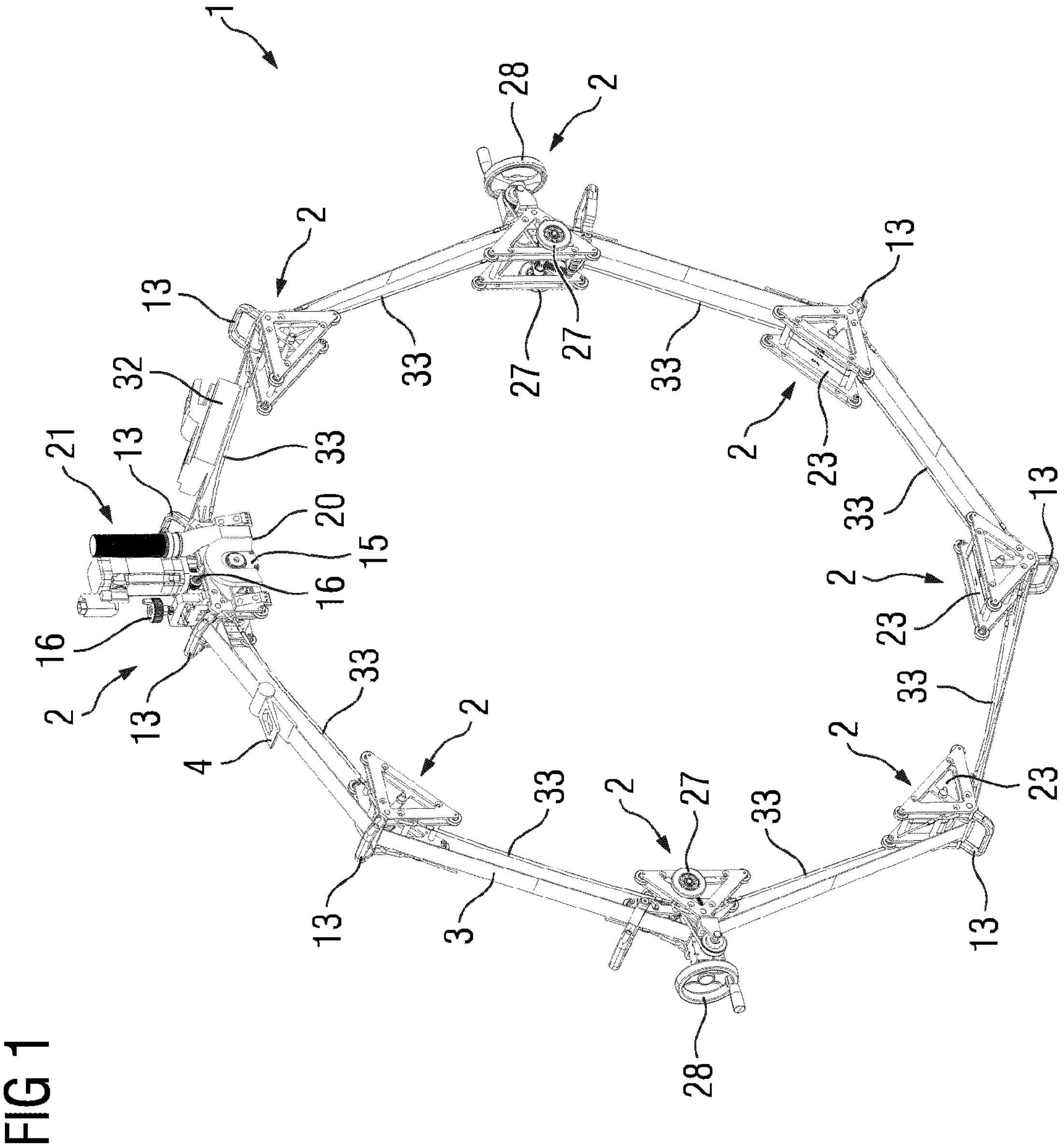
FIG. 1 shows a perspective view of a machining apparatus according to an embodiment of the present invention.
Figure 2:
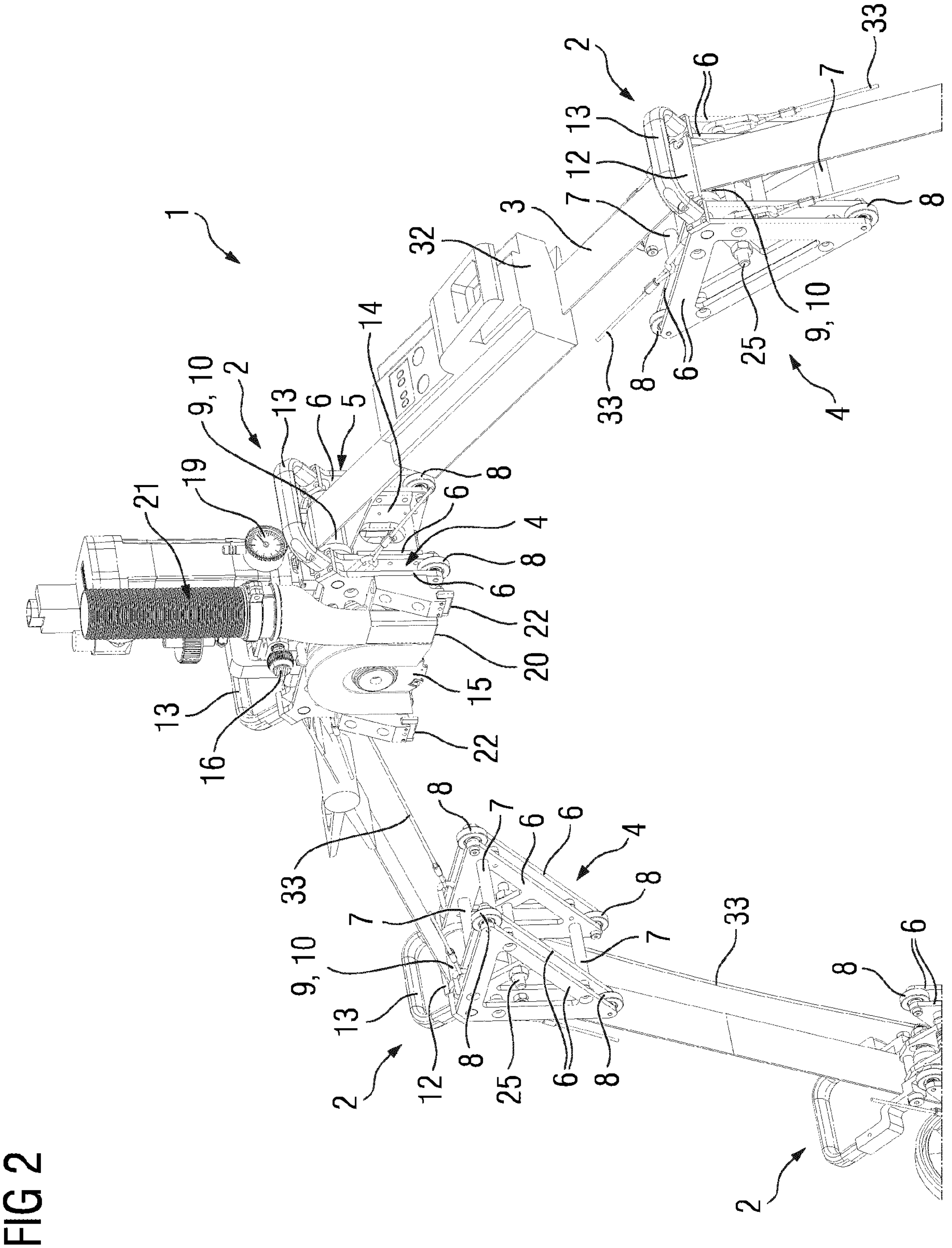
FIG. 2 shows an enlarged perspective view of a subregion of the machining apparatus illustrated in FIG. 1.
Figure 14:
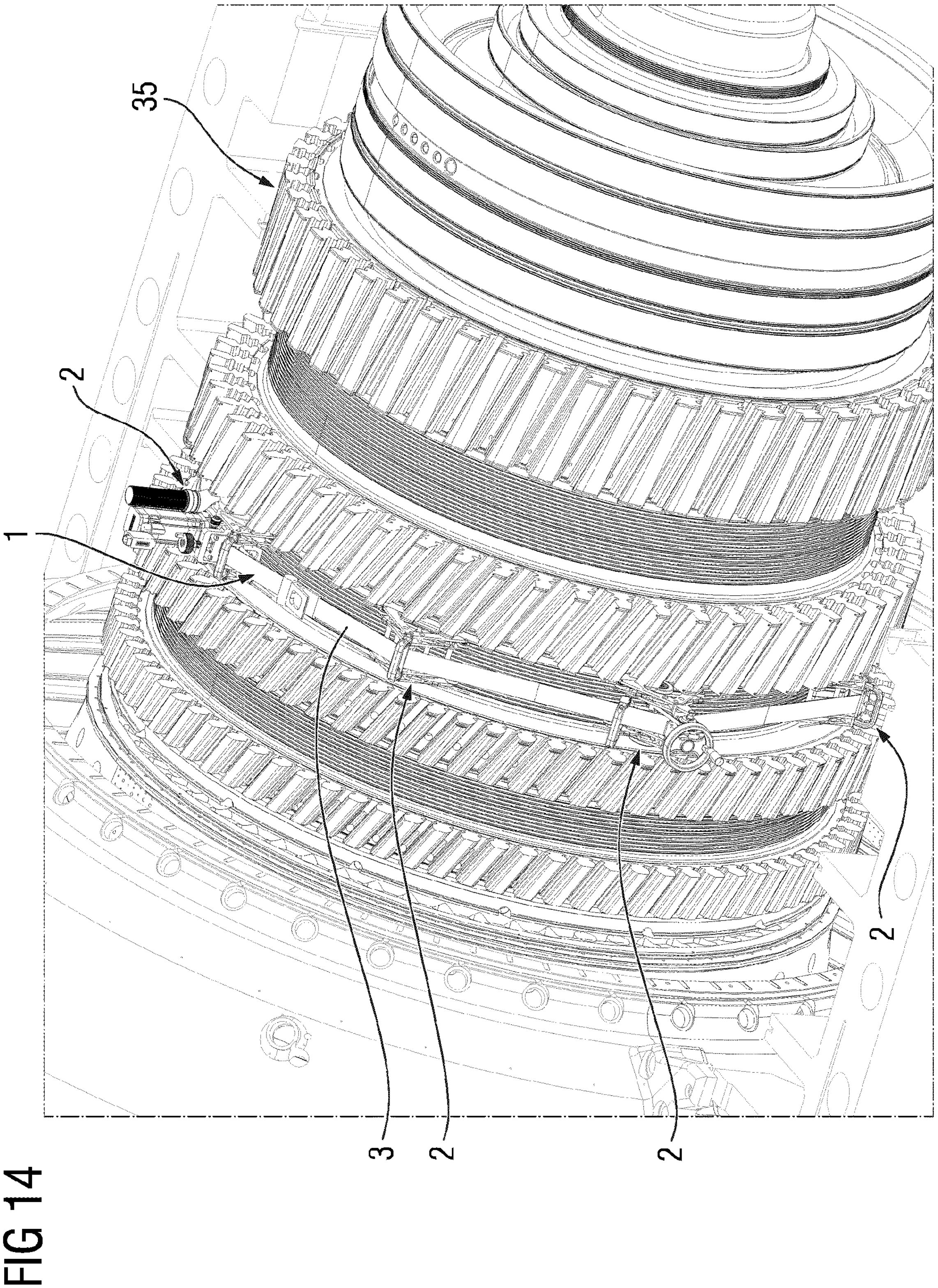
FIG. 14 shows an enlarged perspective partial view of the arrangement illustrated in FIG. 13.
Figure 15:
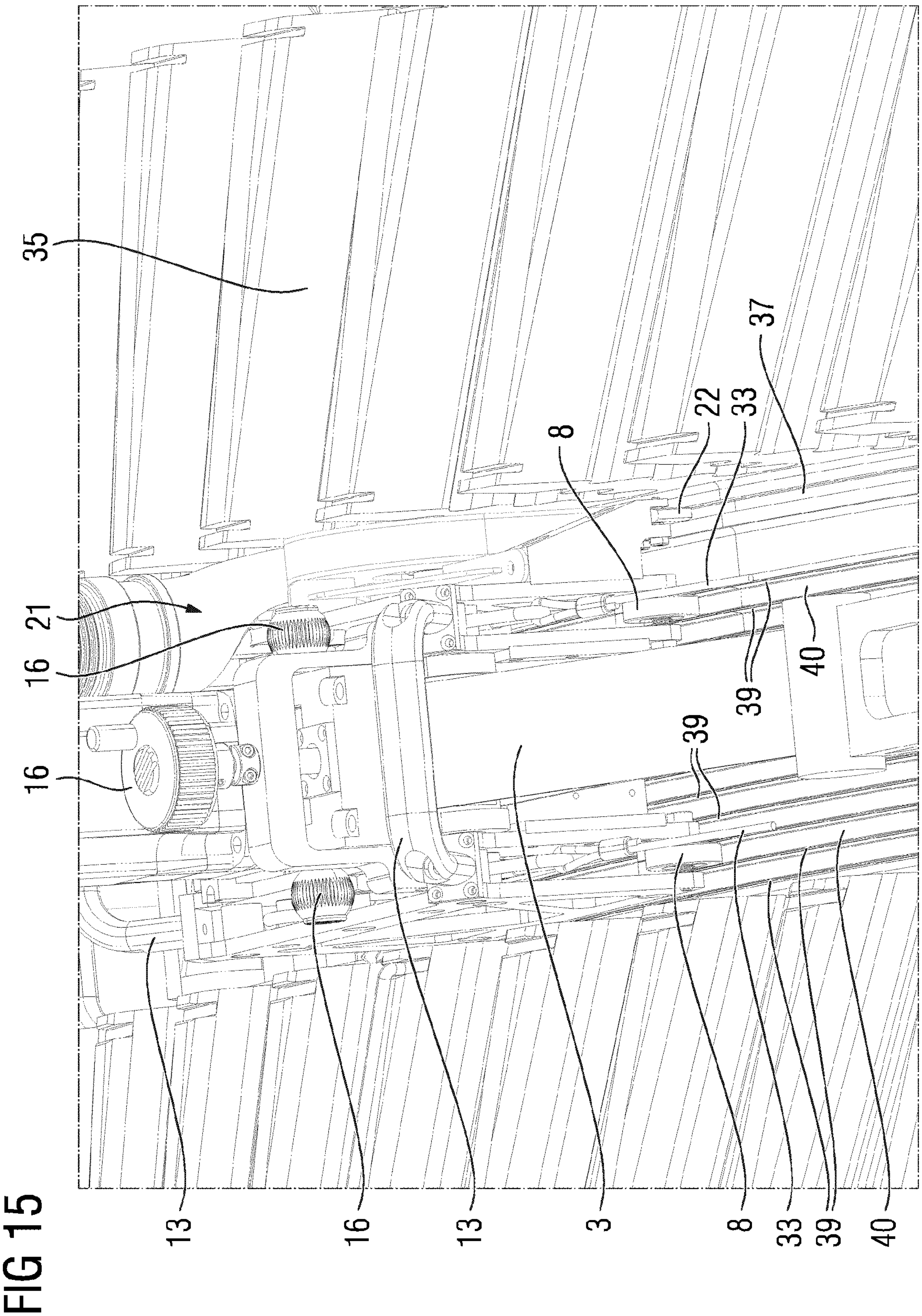
FIG. 15 shows an enlarged perspective plan view of a subregion of the detail illustrated in FIG. 13.
Figure 16:
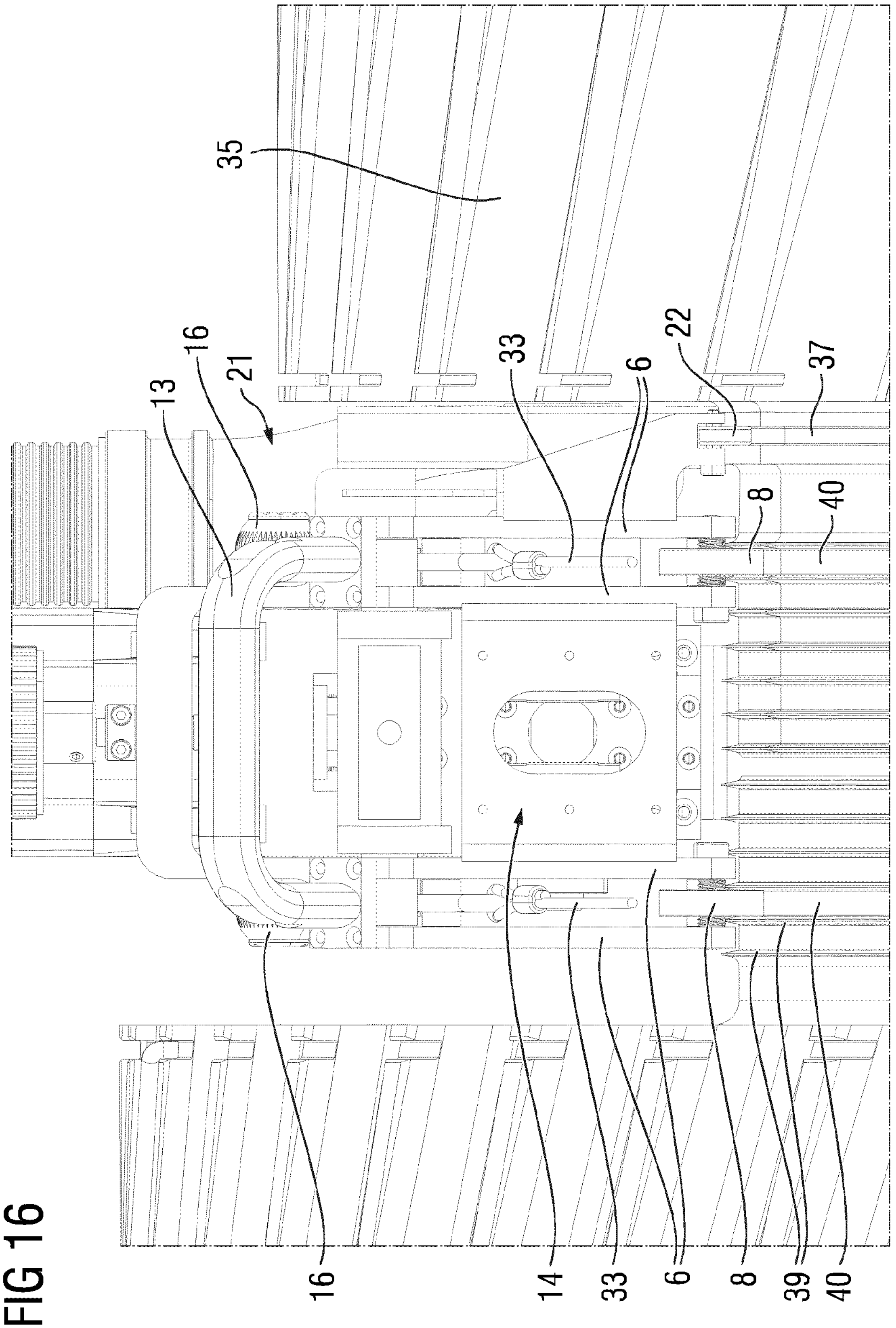
FIG. 16 shows a side view of the arrangement illustrated in FIG. 15.

FIGS. 1 to 12 show a machining apparatus 1 according to an embodiment of the present invention, or components thereof. The machining apparatus 1 serves for machining the outer circumference of a rotor, as will be discussed in more detail below with reference to FIGS. 13 to 15. Said machining apparatus comprises, as main components, multiple separate carriages 2, a lashing strap 3 by means of which the carriages 2 can be connected to one another to create a ring-shaped arrangement, as illustrated in FIGS. 1 and 2, and a tensioning device 4 which is designed for tensioning the lashing strap 3 and which in the present case is in the form of a push-type ratchet.

The machining apparatus 1 illustrated in FIG. 1 has a total of eight carriages 2, wherein it is pointed out that, in principle, the number of carriages 2 is variable. Each carriage 2 has a frame 5, which is formed in the present case by in each case four laterally arranged frame elements 6 that are connected to one another via connecting struts 7. In each case two wheels 8 are held rotatably between two frame elements 6. The wheels are preferably floatingly mounted in order to allow a certain degree of axial play in an axial direction A. Furthermore, all of the carriages are equipped with a lashing strap guide surface 9 which, in the embodiment illustrated, is formed in each case by a lashing strap guide roller 10 mounted rotatably on the frame 5 in the upper region of the carriage 2. Advantageously, seven of the eight carriages 2 comprise in each case one clamping jaw 12 which is movable between a release position and a clamping position and which has a clamping surface 11, wherein the clamping surface 11, in the clamping position, presses in the direction of the lashing strap guide surface 9 such that the lashing strap 3 placed between the lashing strap guide surface 9 and the clamping surface 11 is secured by clamping action. Furthermore, in the present case, each carriage 2 is equipped with at least one handle that is fastened to the associated frame 5.

As shown in FIGS. 3 to 6, one of the carriages 2 has a tool carrier 14 that is designed for receiving a machining tool 15 and for driving said machining tool by motor means, wherein the machining tool 15 is formed in the present case by a side-milling cutter. The tool carrier 14 that is fastened to the frame 5, said frame being formed in the present case by rectangular frame elements 6, comprises advancing devices 17, 18 which are actuatable by means of handwheels 16 and by which the machining tool 15 can be advanced in a radial direction R and in an axial direction A. The advancing device 18 for the radial advancing movement is equipped with an indicator device 19 which indicates the present advancement value, and which in the present case is designed as an indicator dial. An intake opening 20 of a suctioning device 21 of the machining apparatus 1 is positioned adjacent to the machining tool 15 in order to suction away chips that are formed during the machining. Furthermore, on the carriage 2 that receives the tool carrier 14, there are in this case provided two track blocks 22 which protrude outwardly in a radial direction R and which are adjustable in an axial direction A and which are in alignment with one another. The free ends of the two lashing strap parts of the lashing strap 3, which each form a loop, are laid around the lashing strap guide rollers 10 positioned at the end sides on the carriage 2, and are thus fastened to the carriage 2. The lashing strap guide rollers 10 can be released in order to allow the lashing strap 3 to be installed and uninstalled.

Figure 3:
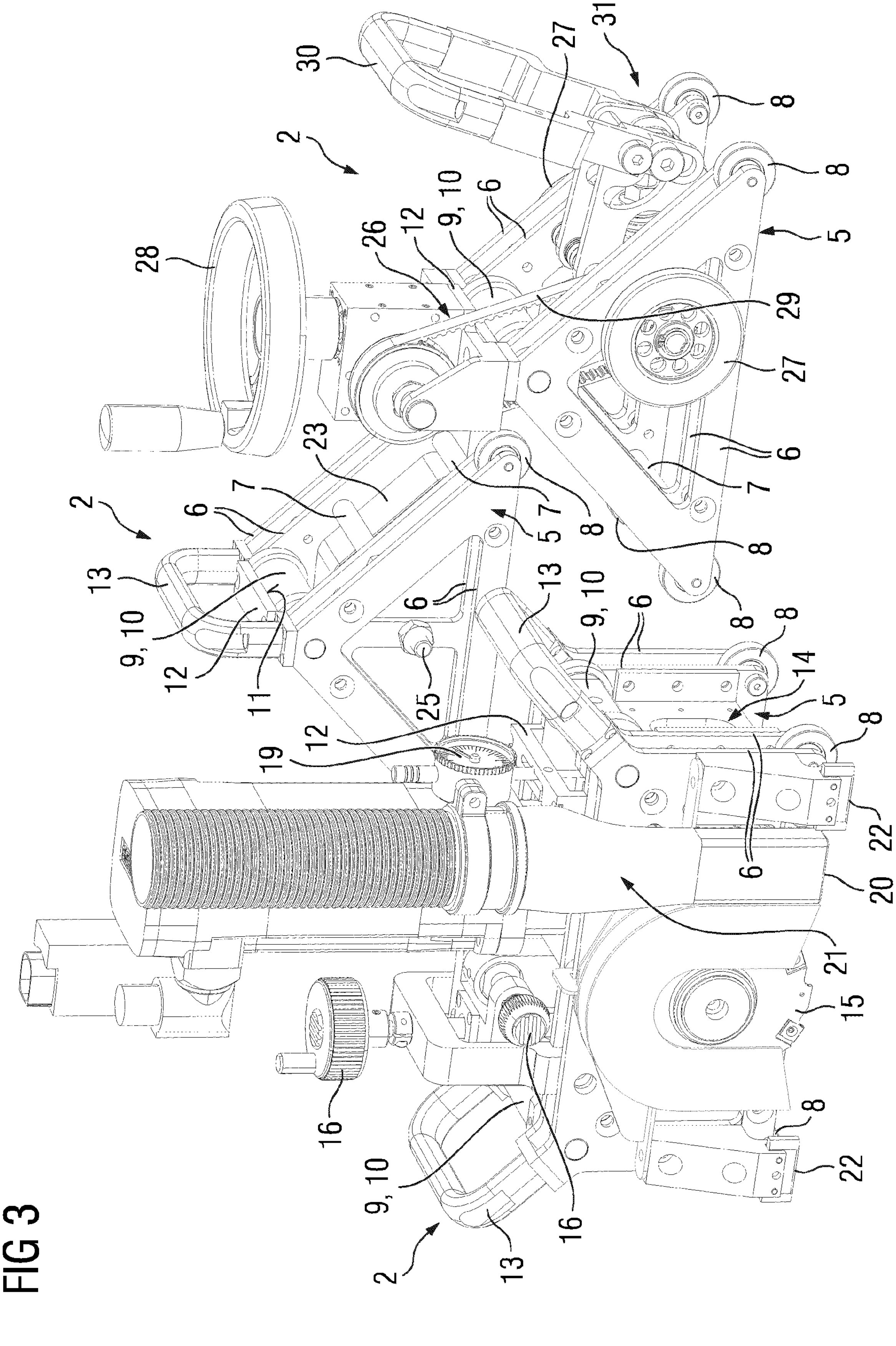
FIG. 3 shows a perspective view showing different carriages of the machining apparatus illustrated in FIG. 1.
Figure 4:
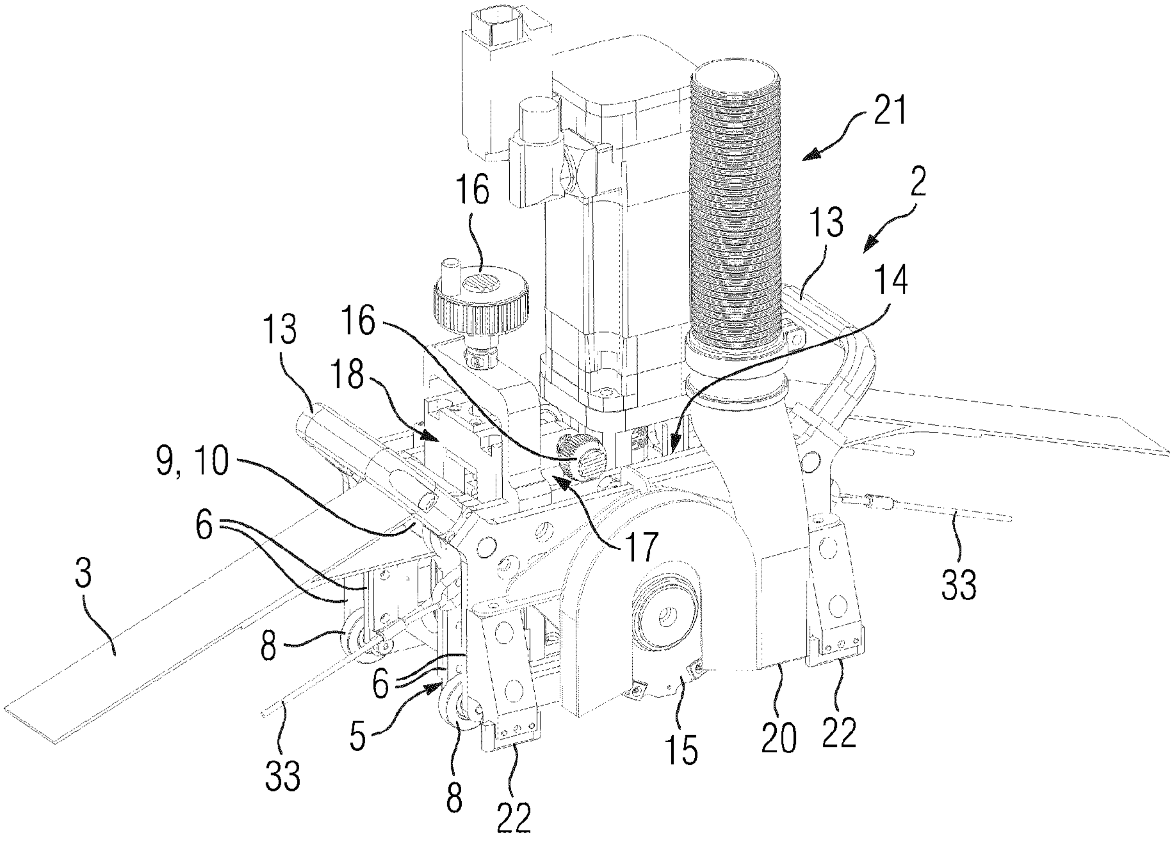
FIG. 4 shows a perspective side view of a carriage, which has a tool carrier, of the machining apparatus illustrated in FIG. 1.
Figure 5:
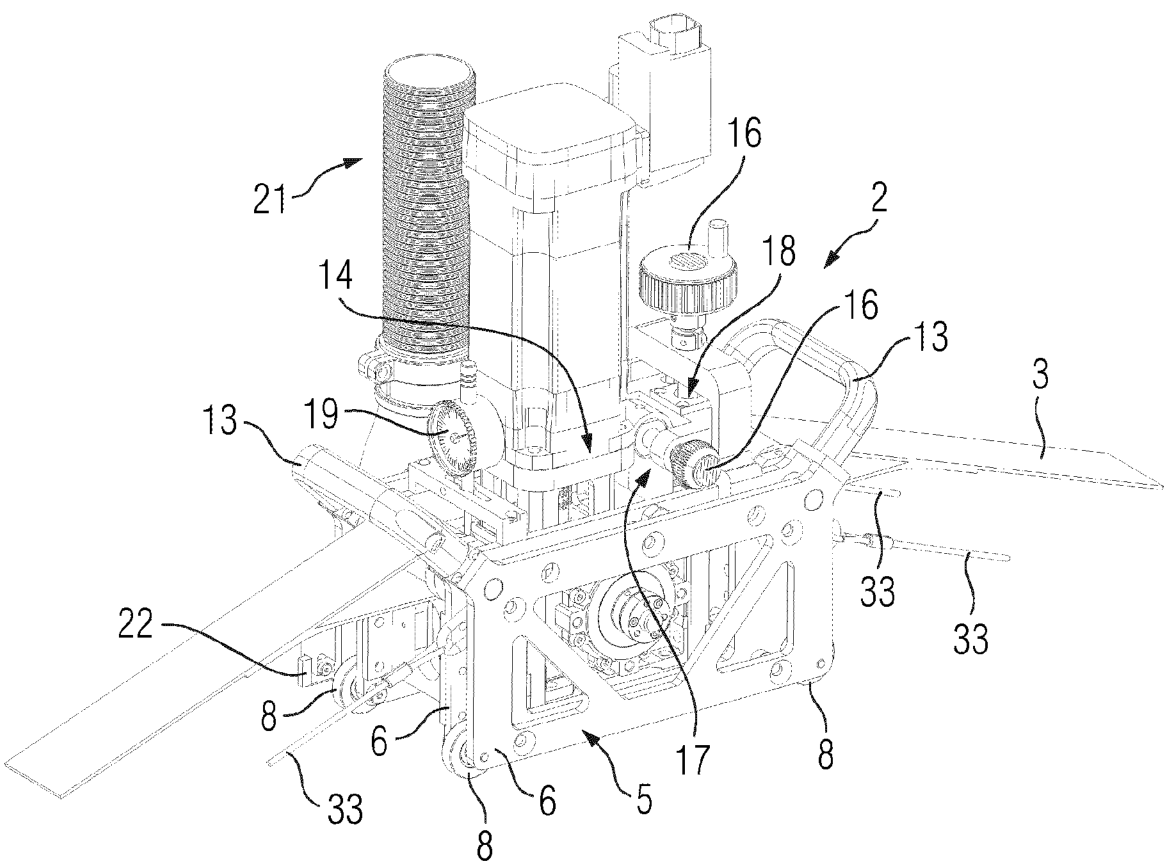
FIG. 5 shows a further perspective side view of the carriage shown in FIG. 4.
Figure 6:
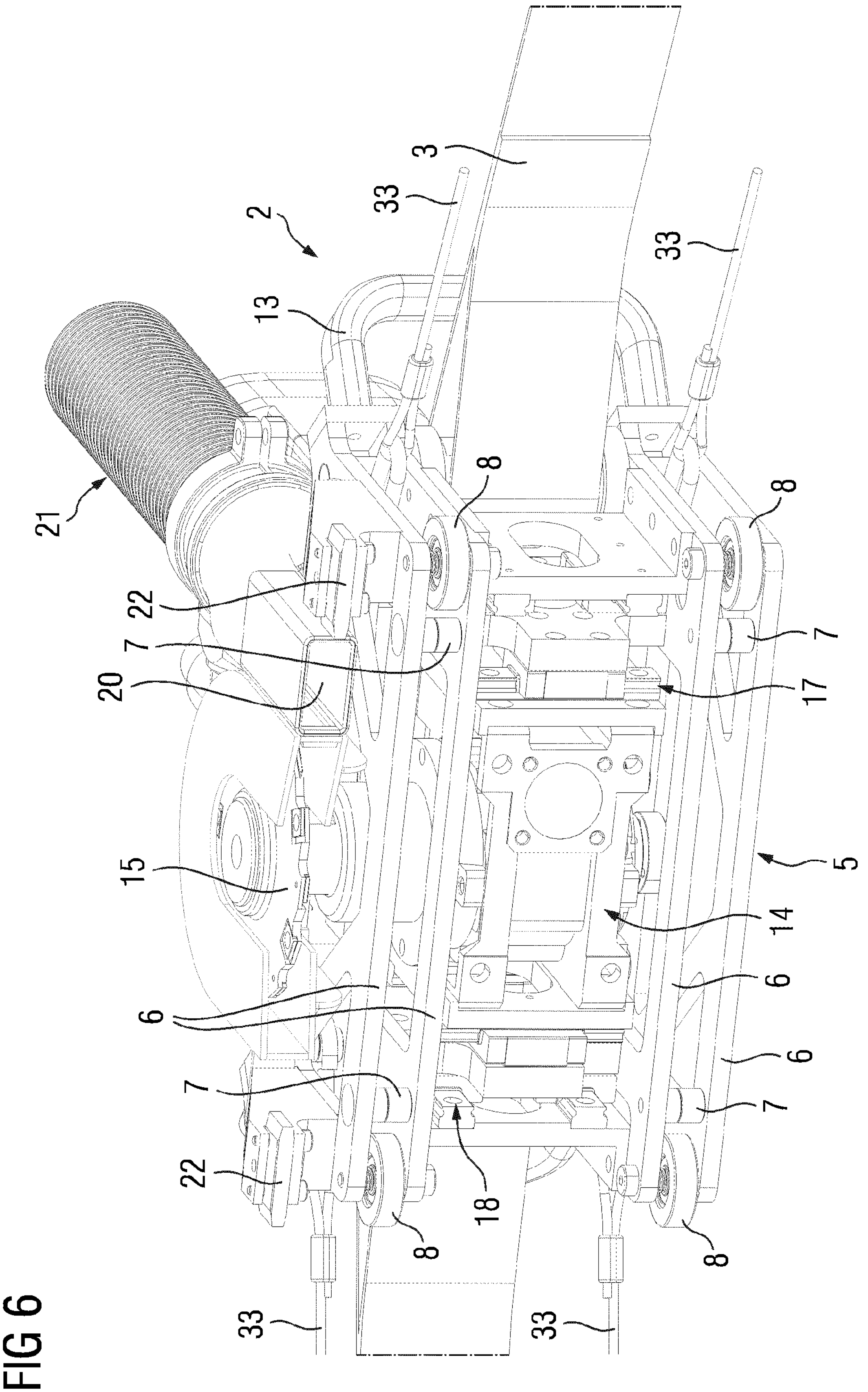
FIG. 6 shows a perspective view from below of the carriage shown in FIG. 4.
Figure 7:
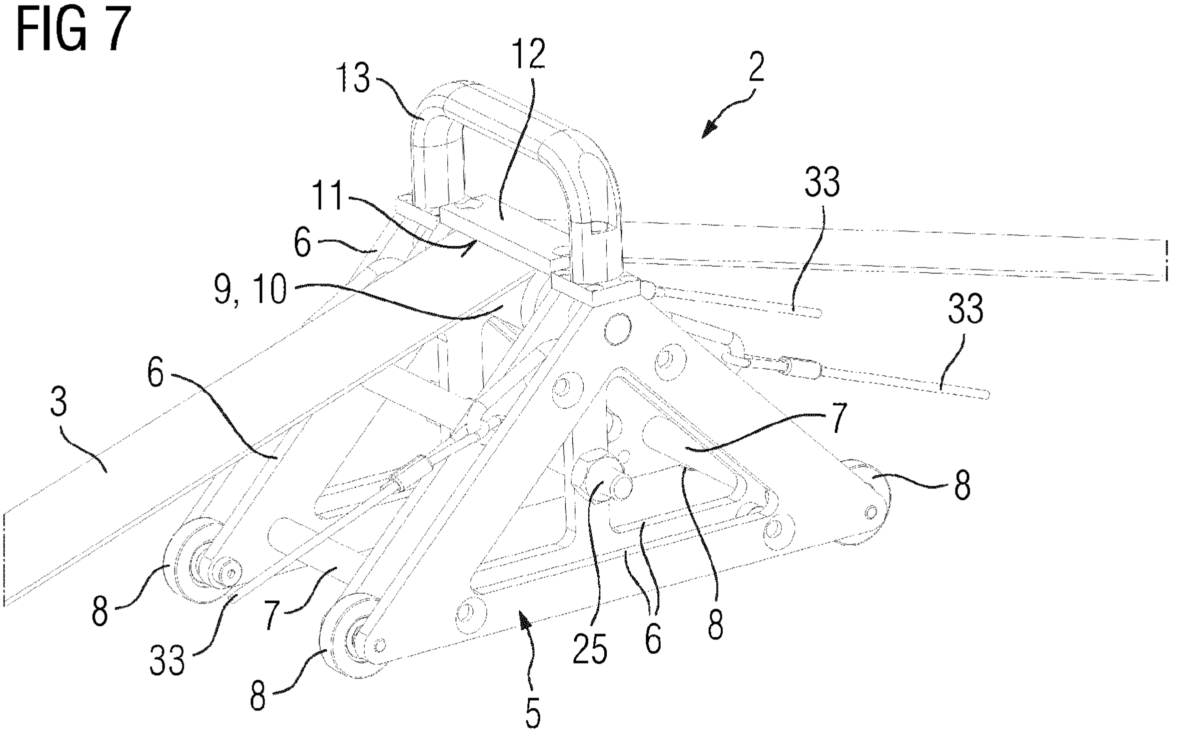
FIG. 7 shows a perspective side view of a further carriage of the machining apparatus illustrated in FIG. 1.
Figure 8:
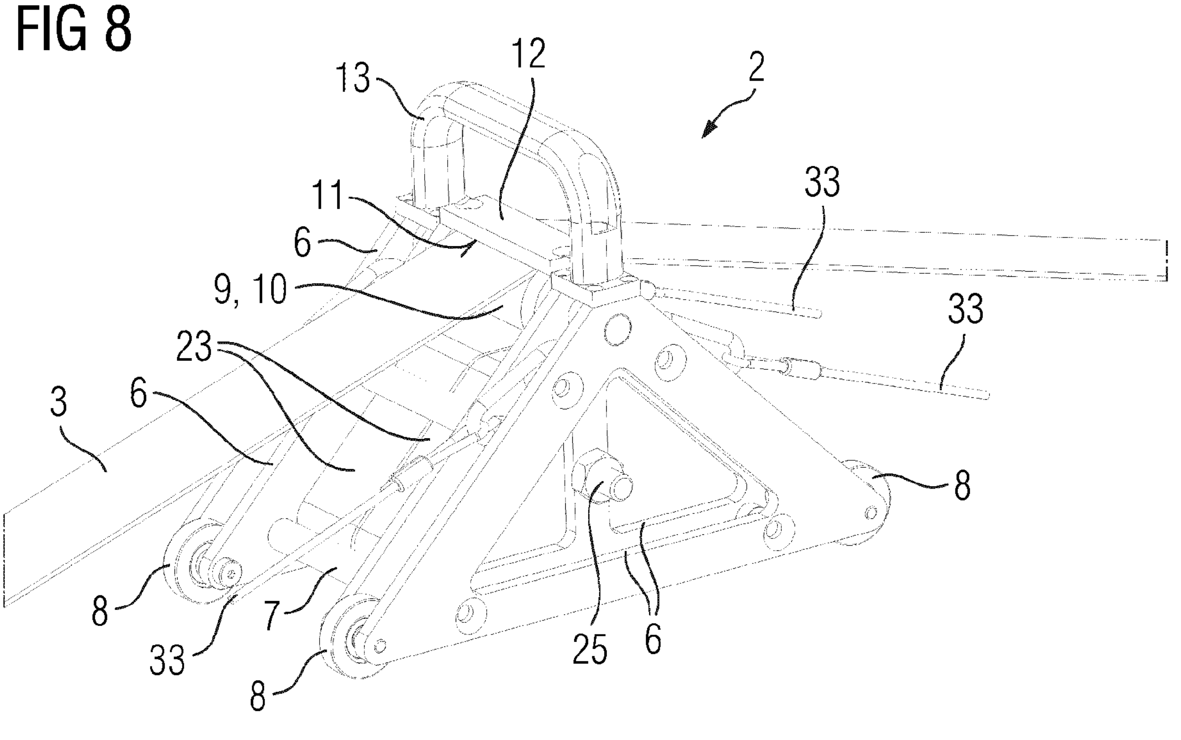
FIG. 8 shows a perspective side view of the carriage illustrated in FIG. 7, with weights received therein.
Figure 9:
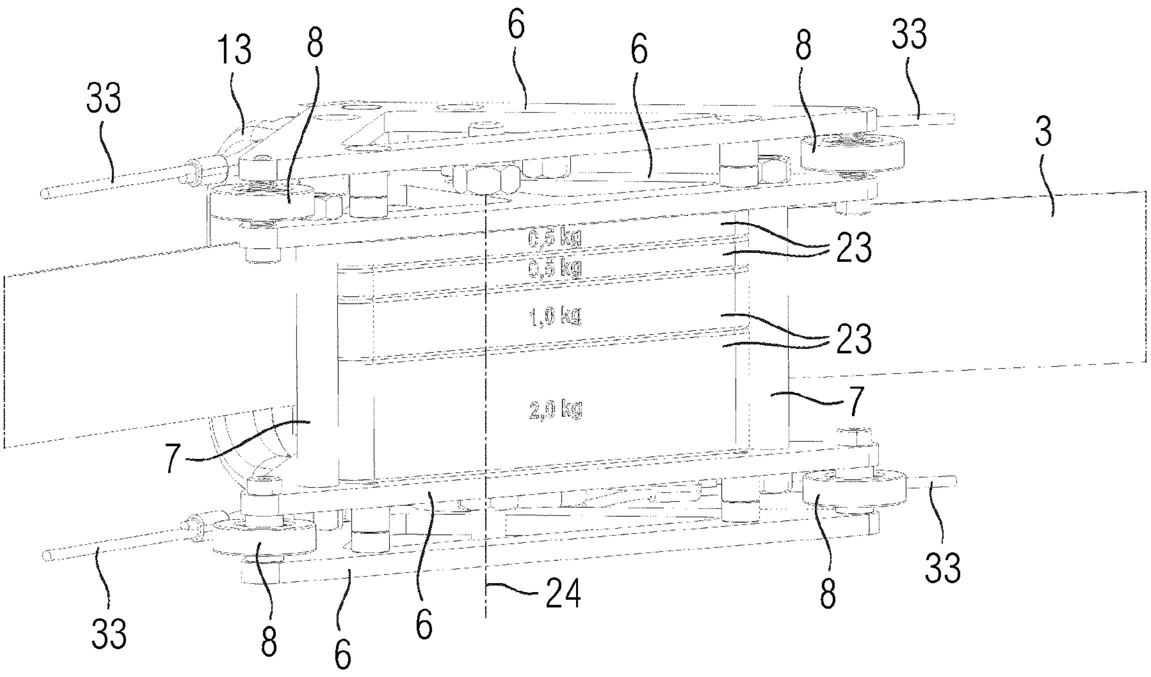
FIG. 9 shows a view from below of the arrangement illustrated in FIG. 8.

Five further carriages 2, one of which is illustrated in detail in FIG. 3 and in FIGS. 7 to 9, serve in this case merely as running and lashing strap diverting carriages. The frames 5 of these carriages 2 are formed in the present case by triangular frame elements 6 and can optionally receive weights 23 of plate-like form, the shape and size of which are adapted to the shape and size of the frame 5 such that the weights 23 can be placed form-fittingly into the relevant frame 5. The weights are each equipped with a through bore 24 for receiving a securing screw 25 which, after the one or more weights 23 have been placed into a carriage 2, can be detachably connected to the frame 5 of the corresponding carriage 2 in order to fasten the weights 23 to the frame 5, as illustrated in FIGS. 8 and 9.

Figure 10:
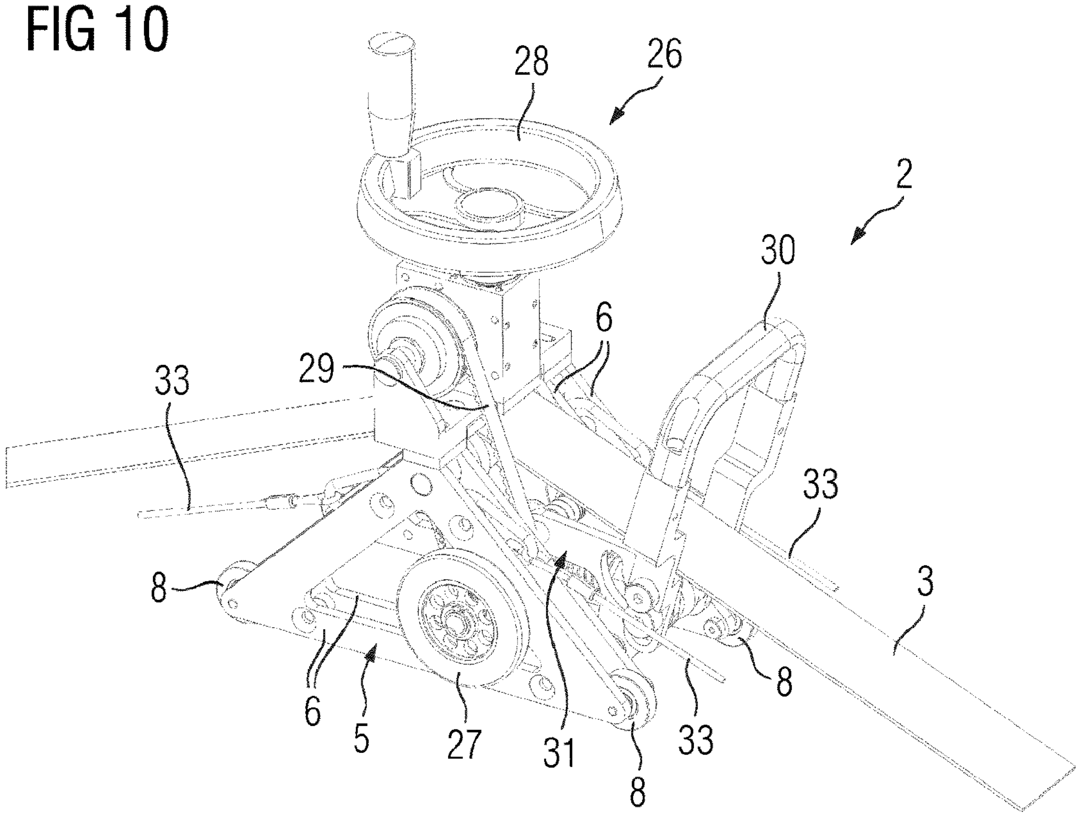
FIG. 10 shows a perspective side view of a further carriage of the machining apparatus illustrated in FIG. 1, which has a lifting device which is actuatable by means of a hand lever and actuation of which enables friction wheels to be moved selectively forward and backward in a radial direction, wherein the hand lever is situated in a first position.
Figure 11:
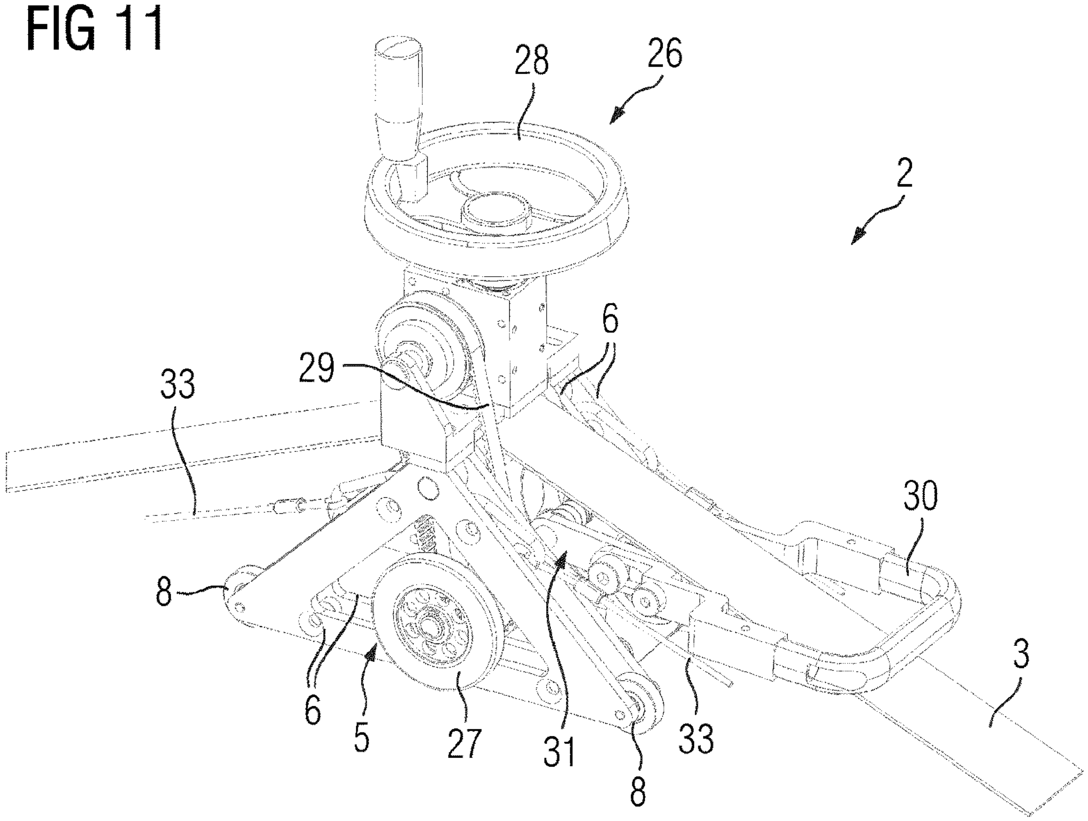
FIG. 11 shows a perspective view of the carriage illustrated in FIG. 10, with the hand lever situated in a second position.
Figure 12:
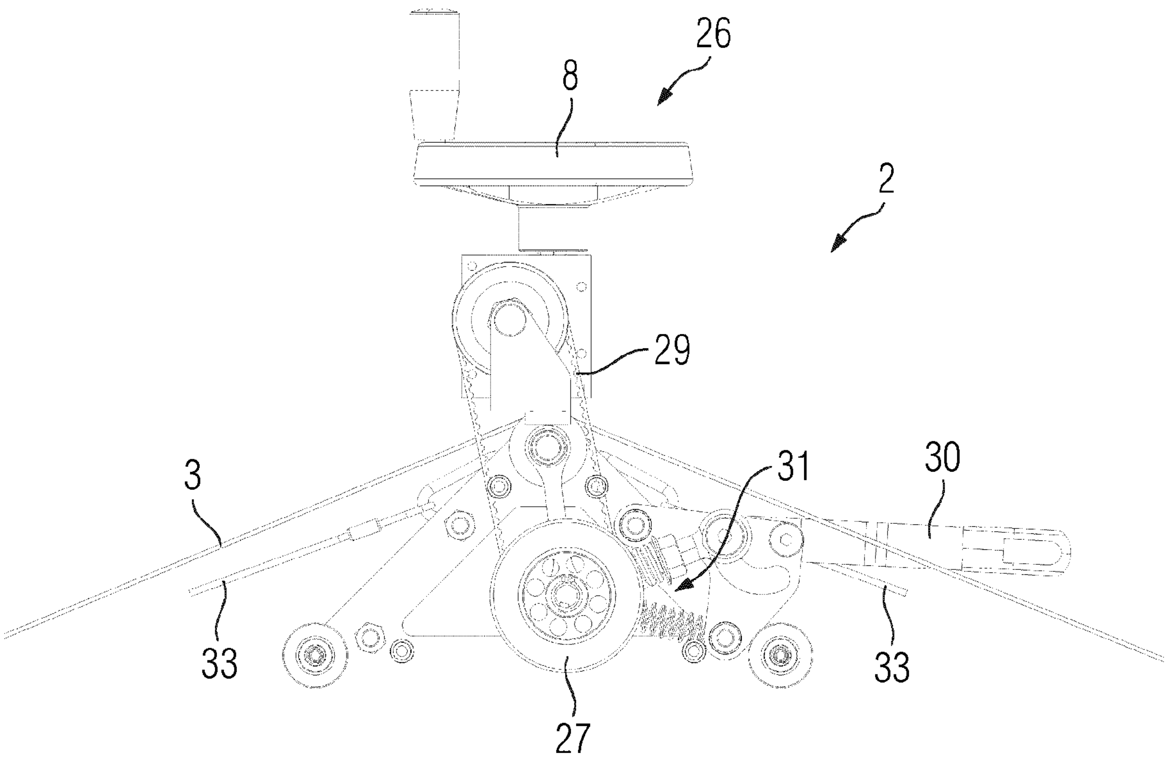
FIG. 12 shows a side view of the arrangement illustrated in FIG. 11.

Two further carriages 2 of the machining apparatus 1, the frames 5 of which are in this case likewise formed by triangular frame elements 6, have a feed device 26 as illustrated in FIG. 3 and in FIGS. 10 to 12, actuation of which feed device causes the corresponding carriage 2 to be moved in a forward and/or backward direction of travel or circumferential direction U. The feed device 26 in this case comprises friction wheels 27 that are drivable via a belt drive 29 that is actuatable by means of a handwheel 28. Furthermore, a lifting device 31 is provided which is actuatable by means of a hand lever 30 and actuation of which enables the friction wheels 27 to be moved selectively forward and backward in a radial direction R in order to set the friction wheels 27 down on, or lift said friction wheels off from, a rotor that is to be machined.

The free ends of the two lashing straps 3 can be detachably connected to one another in a known manner by means of the tensioning device 4.

The machining apparatus 1 furthermore in this case has a measuring device 32 that indicates the present tension force of the lashing strap 3, said tension force being imparted by means of the tensioning device 4.

As further components, the illustrated machining apparatus has sixteen steel cables 33, of which in each case two steel cables 33 connect adjacent carriages 2 to one another in order to additionally secure them.

FIGS. 13 to 16 show a gas turbine 34 that has a rotor 35 comprising multiple turbine wheel disks 36. In the case of the gas turbine 34, cooling air leaks have occurred at one of the turbine wheel disks 36 during operation. Said leaks occur between sealing plates (not illustrated in any more detail in the figures) and the corresponding turbine wheel disk 36. To eliminate the cooling air leaks, it is sought to insert an additional sealing strip. For this purpose, an existing groove 37 into which the sealing plates of the additional sealing strip are to be inserted must be deepened by approximately 1.5 mm in the radial direction R. It is sought to deepen the groove 37 on an installed rotor 35, in situ at the installation site of the gas turbine 34, by machining using the machining apparatus 1 illustrated in FIGS. 1 and 2. For this purpose, in a first step, the upper turbine housing half of the turbine housing 38 that houses the rotor region that is to be machined is lifted off, and the turbine stator blade carrier is uninstalled, as shown in FIG. 13, in order to allow access to the rotor region that is to be machined. In a further step, the carriages 2 that are connected to one another via the steel cables 33 and the lashing strap 3 are arranged such that the individual carriages 2 are positioned in alignment, and as far as possible at uniform intervals, in a circumferential direction U, and so as to be immediately adjacent, in an axial direction A, to the rotor region that is to be machined. Here, the wheels 8 of the carriages 2 engage into, and are guided in, intermediate spaces 40 which are formed between provided sealing strips 39 and which extend in the circumferential direction U. The floating mounting of the wheels 8 allows displacement of the wheels 8 in an axial direction A such that they fit into the intermediate spaces 40. The track blocks 22 of the carriage 2 that receives the tool carrier 14 are positioned so as to engage into the groove 37 that is to be machined, in order to ensure exact guidance of said carriage 2. In a further step, the free ends of the lashing strap 3 are connected to one another by means of the tensioning device 4 and are subsequently tensioned until a predetermined tension force is attained, which can be read off on the measuring device 32. Furthermore, weights 23 can be placed into the frames 5 of those carriages 2 which are arranged opposite the carriage 2 comprising the tool carrier 14, in order to compensate for imbalances. The arrangement illustrated in FIG. 13 has now been produced.

To carry out the machining, the machining tool 15 is now activated so as to be driven in rotation. The axial and radial advancement of the machining tool 15 are performed manually by means of the corresponding advancing devices 17 and 18. The feed movement in the circumferential direction U is implemented manually. For this purpose, an operator may grip one of the handles 13 and pull the associated carriage 2 in the circumferential direction U. Alternatively, the operator may also implement the feed movement by means of one of the feed devices 26. For this purpose, the operator pushes the hand lever 30 of one of the lifting devices 31 downward in order to thus set the friction wheel 27 of the lifting device 31 down onto the rotor 35.

The operator subsequently actuates the handwheel 28 of the feed device 26 in order to drive the friction wheels 27 via the belt drive 29.

Although the invention has been illustrated and described in more detail on the basis of the preferred exemplary embodiment, the invention is not restricted by the disclosed examples, and a person skilled in the art may derive other variations from these without departing from the scope of protection of the invention.

The invention claimed is:

1. A machining apparatus which is designed for machining an outer circumference of a rotor, comprising:
multiple separate carriages, at least one lashing strap adapted to connect the carriages to one another to create a ring-shaped arrangement, and a tensioning device which is designed for tensioning the lashing strap,
wherein the carriages are each equipped with wheels which are oriented in a direction of travel, and
wherein at least one carriage has a tool carrier for receiving a machining tool and for driving said machining tool by a motor.

2. The machining apparatus as claimed in claim 1,
wherein at least some carriages are equipped with a lashing strap guide surface that is formed by a lashing strap guide roller.

3. The machining apparatus as claimed in claim 2,
wherein at least some carriages comprise at least one clamping jaw which is movable between a release position and a clamping position and which has a clamping surface,
wherein the clamping surface, in the clamping position, presses in the direction of the lashing strap guide surface such that the lashing strap placed between the lashing strap guide surface and the clamping surface is secured by clamping action.

4. The machining apparatus as claimed in claim 1,
wherein at least some carriages have a frame to which the wheels are rotatably fastened.

5. The machining apparatus as claimed in claim 4,
wherein said machining apparatus has weights, and
wherein a shape and a size of the weights are adapted to a shape and a size of the frame such that the weights can be placed into the frame.

6. The machining apparatus as claimed in claim 5,
wherein the weights are equipped with at least one through bore for receiving a securing screw which, after the one or more weights have been placed into a carriage, is detachably connectable to the frame of the corresponding carriage.

7. The machining apparatus as claimed in claim 1,
wherein at least some carriages have handles.

8. The machining apparatus as claimed in claim 1,
wherein the tool carrier has advancing devices for at least radially and axially advancing the machining tool,
wherein at least one advancing device is equipped with a display device that indicates a present advancement value.

9. The machining apparatus as claimed in claim 1,
wherein the machining tool is a side-milling cutter.

10. The machining apparatus as claimed in claim 1, further comprising:
a suctioning device, an intake opening of which is positioned adjacent to the machining tool.

11. The machining apparatus as claimed in claim 1,
wherein the carriage that receives the tool carrier is equipped with at least two track blocks which protrude radially outwardly from the carriage and which are adjustable in an axial direction and which are in alignment with one another.

12. The machining apparatus as claimed in claim 1, further comprising:
a measuring device that indicates a present tension force of the lashing strap.

13. The machining apparatus as claimed in claim 1,
wherein said machining apparatus has steel cables that are designed to connect adjacent carriages in order to secure the adjacent carriages to each other.

14. The machining apparatus as claimed in claim 1,
wherein at least eight carriages are provided.

15. The machining apparatus as claimed in claim 1,
wherein at least one carriage has a feed device, actuation of which causes the carriage to be moved in a forward and/or a backward direction of travel.

16. The machining apparatus as claimed in claim 15,
wherein the feed device has friction wheels that are drivable via a belt drive that is actuatable by a handwheel.

17. The machining apparatus as claimed in claim 16, further comprising:
at least one lifting device which is in particular actuatable by a hand lever and actuation of which enables the friction wheels to be moved selectively forward and backward in a radial direction.

18. A method for machining an outer circumference of a rotor, the method comprising:
providing a machining apparatus as claimed in claim 1,
arranging the carriages, which have been connected to one another by the at least one lashing strap, such that the carriages are positioned on the rotor, as far as possible at uniform intervals in a circumferential direction, in a rotor region that is to be machined,
tensioning the lashing strap until a predetermined tension force is attained, and
machining the rotor using the machining tool.

19. The method as claimed in claim 18, wherein a feed direction of the machining tool during the machining is realized by manual movement of the carriage in the circumferential direction of the rotor.

20. The method as claimed in claim 18, wherein a carriage that is equipped with weights is disposed opposite the at least one carriage that has a tool carrier.

21. The method as claimed in claim 18, wherein said method is carried out in situ at an installation site of a machine that has the rotor.

* * * * *